(12) United States Patent
Nuzzi (10) Patent No.: US 10,091,313 B2
(45) Date of Patent: Oct. 2, 2018

(54) METHOD AND SYSTEM FOR TRACKING WEB LINK USAGE

(71) Applicant: eBay Inc., San Jose, CA (US)

(72) Inventor: Frank Anthony Nuzzi, Pflugerville, TX (US)

(73) Assignee: eBay Inc., San Jose, CA (US)

( * ) Notice: Subject to any disclaimer, the term of this patent is extended or adjusted under 35 U.S.C. 154(b) by 218 days.

(21) Appl. No.: 15/140,848

(22) Filed: Apr. 28, 2016

(65) Prior Publication Data

US 2016/0241656 A1  Aug. 18, 2016

Related U.S. Application Data

(63) Continuation of application No. 13/050,328, filed on Mar. 17, 2011, now abandoned.

(51) Int. Cl.
| | |
|---|---|
| *G06F 17/00* | (2006.01) |
| *H04L 29/08* | (2006.01) |
| *G06F 17/30* | (2006.01) |
| *H04L 29/06* | (2006.01) |

(52) U.S. Cl.
CPC ........ *H04L 67/22* (2013.01); *G06F 17/30528* (2013.01); *G06F 17/30867* (2013.01); *H04L 67/02* (2013.01); *H04L 67/327* (2013.01); *H04L 67/42* (2013.01)

(58) Field of Classification Search
CPC ....................... G06F 17/3089; G06F 17/30528
See application file for complete search history.

(56) References Cited

U.S. PATENT DOCUMENTS

| | | |
|---|---|---|
| 5,761,683 A | 6/1998 | Logan et al. |
| 5,819,094 A | 10/1998 | Sato et al. |
| 5,870,559 A | 2/1999 | Leshem et al. |
| 5,958,016 A | 9/1999 | Chang et al. |
| 6,037,935 A | 3/2000 | Bates et al. |
| 6,076,166 A | 6/2000 | Moshfeghi et al. |
| 7,467,349 B1 | 12/2008 | Bryar et al. |
| 7,636,892 B2 | 12/2009 | Elie |
| 8,468,452 B2 * | 6/2013 | Zellweger ............... G06T 13/00 715/205 |

(Continued)

FOREIGN PATENT DOCUMENTS

WO   WO-2012125799 A2   9/2012

OTHER PUBLICATIONS

U.S. Appl. No. 13/050,328, filed Mar. 17, 2011, Method and System for Tracking Web Link Usage.

(Continued)

*Primary Examiner* — Laurie A Ries
(74) *Attorney, Agent, or Firm* — Wolfe-SBMC (57) ABSTRACT

A method and system for tracking web link usage is provided. An example system includes a request detector, a click history module, a link presentation generator, and a serving module. The request detector may be configured to receive a request for a web page comprising a web link. The click history module may be configured to access click history associated with the user account. The link presentation generator may be configured to modify the web page, utilizing the click history. The serving module may be configured to serve the modified web page in response to the request for the web page.

20 Claims, 7 Drawing Sheets

(56) References Cited

U.S. PATENT DOCUMENTS

| | | | |
|---|---|---|---|
| 2002/0003534 A1* | 1/2002 | Hayashi | G06T 13/80 345/204 |
| 2002/0019771 A1 | 2/2002 | Shuster | |
| 2002/0075302 A1 | 6/2002 | Simchik | |
| 2002/0107735 A1 | 8/2002 | Henkin et al. | |
| 2002/0198882 A1* | 12/2002 | Linden | G06F 17/30867 |
| 2003/0016253 A1* | 1/2003 | Aoki | G06F 1/1626 715/863 |
| 2003/0028892 A1 | 2/2003 | Gewickey et al. | |
| 2003/0074635 A1* | 4/2003 | Cao | G06F 17/30867 715/205 |
| 2003/0212760 A1 | 11/2003 | Chen et al. | |
| 2005/0028104 A1 | 2/2005 | Apparao et al. | |
| 2005/0240875 A1 | 10/2005 | Takayama et al. | |
| 2005/0256837 A1 | 11/2005 | Kira | |
| 2006/0010229 A1 | 1/2006 | Chen | |
| 2007/0233692 A1* | 10/2007 | Lisa | G06F 17/30651 |
| 2007/0244906 A1* | 10/2007 | Colton | G06F 17/2288 |
| 2008/0148193 A1* | 6/2008 | Moetteli | G06F 17/30873 715/854 |
| 2008/0235594 A1* | 9/2008 | Bhumkar | G06F 17/30899 715/738 |
| 2009/0276407 A1 | 11/2009 | Van Vleet et al. | |
| 2010/0131455 A1* | 5/2010 | Logan | G06F 17/30905 707/602 |
| 2010/0205541 A1 | 8/2010 | Rapaport et al. | |
| 2010/0250714 A1 | 9/2010 | Wehmann et al. | |
| 2011/0010307 A1 | 1/2011 | Bates et al. | |
| 2011/0125393 A1* | 5/2011 | Williams | G06Q 30/0273 701/532 |
| 2011/0125832 A1 | 5/2011 | Dahl | |
| 2011/0126087 A1* | 5/2011 | Aust | G06F 17/30873 715/206 |
| 2011/0161792 A1* | 6/2011 | Florence | G06F 17/30882 715/205 |
| 2012/0137201 A1* | 5/2012 | White | G06F 17/30899 715/205 |
| 2012/0240019 A1 | 9/2012 | Nuzzi | |

OTHER PUBLICATIONS

"U.S. Appl. No. 13/050,328, Appeal Brief filed Jul. 29, 2013", 22 pgs.

"U.S. Appl. No. 13/050,328, Advisory Action dated Jun. 10, 2013", 3 pgs.

"U.S. Appl. No. 13/050,328, Appeal Decision dated Mar. 2, 2016", 6 pgs.

"U.S. Appl. No. 13/050,328, Final Office Action dated Jan. 25, 2013", 14 pgs.

"U.S. Appl. No. 13/050,328, Non Final Office Action dated Aug. 28, 2012", 13 pgs.

"U.S. Appl. No. 13/050,328, Response filed May 28, 2013 to Final Office Action dated Jan. 25, 2013", 12 pgs.

"U.S. Appl. No. 13/050,328, Response filed Nov. 28, 2012 to Non Final Office Action dated Aug. 28, 2012", 10 pgs.

"International Application Serial No. PCT/US2012/29186, International Search Report dated Jun. 8, 2012", 2 pgs.

"International Application Serial No. PCT/US2012/29186, Written Opinion dated Jun. 8, 2012", 5 pgs.

* cited by examiner

METHOD AND SYSTEM FOR TRACKING WEB LINK USAGE

CLAIM OF PRIORITY

This application is a continuation of U.S. application Ser. No. 13/050,328, filed Mar. 17, 2011, which is hereby incorporated by reference in its entirety.

TECHNICAL FIELD

This application relates to the technical fields of software and/or hardware technology and, in one example embodiment, to system and method for tracking web link usage.

BACKGROUND

An increasing amount of information has become available over the Internet, which has led to the development of various resources such as, e.g., search engines, that may be utilized to obtain information. Finding particular information can be a challenging and time-consuming task. A software application for retrieving and presenting information resources on the Internet is referred to as a web browser or merely a browser. An information resource, e.g., a web page, may include one or more hyperlinks that enable users to navigate to other web pages or other information resources by activating their respective associated Uniform Resource Locators (URLs). A web browser usually displays a hyperlink in a distinguishing way, e.g. using a certain color or style. A hyperlink that has been previously activated during a session associated with a user is often displayed by a browser in a different color during a subsequent session associated with the same user, in order to provide an indication that the user has already requested to activate the link.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system for tracking usage of web links is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on administration of Java-based servers and related environments, the embodiments are given merely for clarity in disclosure. Thus, any type of server environment, including various system architectures, may employ various embodiments of the application-centric resources system and method described herein and is considered as being within a scope of the present invention.

A link (also referred to as hyperlink or Web link) is a hypertext construct that provides a connection from one web page to another. When a user clicks on a link provided on a web page displayed by a browser application, the next time the same web page is displayed to the user, the browser displays the clicked link in a different color in order to indicate that the link has already been clicked on. Some existing browsers continue to display the clicked link in a different color every time the user loads the page, regardless of when the link was activated last. A method and system may be provided for tracking usage history for a link and presenting the link in a manner that is based on the collected usage history. In one example embodiment, a computer-implemented module termed a link usage tracker may collect respective data associated with links. The data being collected—historical usage data associated with the link and a user—may include the time elapsed since the last activation of the link, frequency of link activation, as well as statistics associated with the use of the resource being accessed via the link. The link usage tracker may be configured to interpreted historical data as indicative of a certain level of usefulness of the link to the user and to determine a presentation style for the link. When the user returns to a previously visited web page, the link usage tracker may apply different presentation styles to links based on their associated usage data (also termed "previous click history"). For example, a more-recently-clicked link would be displayed with a more distinctive highlighting than a less-recently clicked link. In one embodiment, a highlighted link may also be associated with a hover balloon displaying the date and/or time when the link was last accessed. The historical usage data associated with respective links may be stored in a database or locally with respect to the browser application. In one embodiment, a user may be permitted to customize the way the highlighting or previous click history information is displayed, e.g., by selecting either a textual hover version or highlighting.

In some embodiments, a link usage tracker may be implemented for use at a client computer system, e.g., as a browser plug-in and/or base browser where the link usage tracking feature is provided as a native feature of the browser. A browser plug-in may be configured to locally store data about the clicked links, such as the time of a click the frequency of clicks with respect to a link, etc. A link usage tracker provided at a client computer system may also be configured to modify the HyperText Markup Language (HTML) content of the subject web page such that one or more links that are present on the subject web page are displayed in a manner indication how recently each link has been clicked. The browser would then render the modified subject web page.

In some embodiments, a link usage tracker may be implemented to reside at a server computer system, e.g., at a computer system hosting a web site that provides a subject web page. A link usage tracker residing at a server computer system may be configured to track the links a user clicked based upon a login session and store information about the clicked links. A link usage tracker provided at a server computer system may also be configured to modify the HyperText Markup Language (HTML) content of the subject web page such that one or more links that are present on the subject web page are displayed in a manner indication how recently each link has been clicked. The modified subject web page may then be provided to the requesting browser application for rendering.

Figure 1:
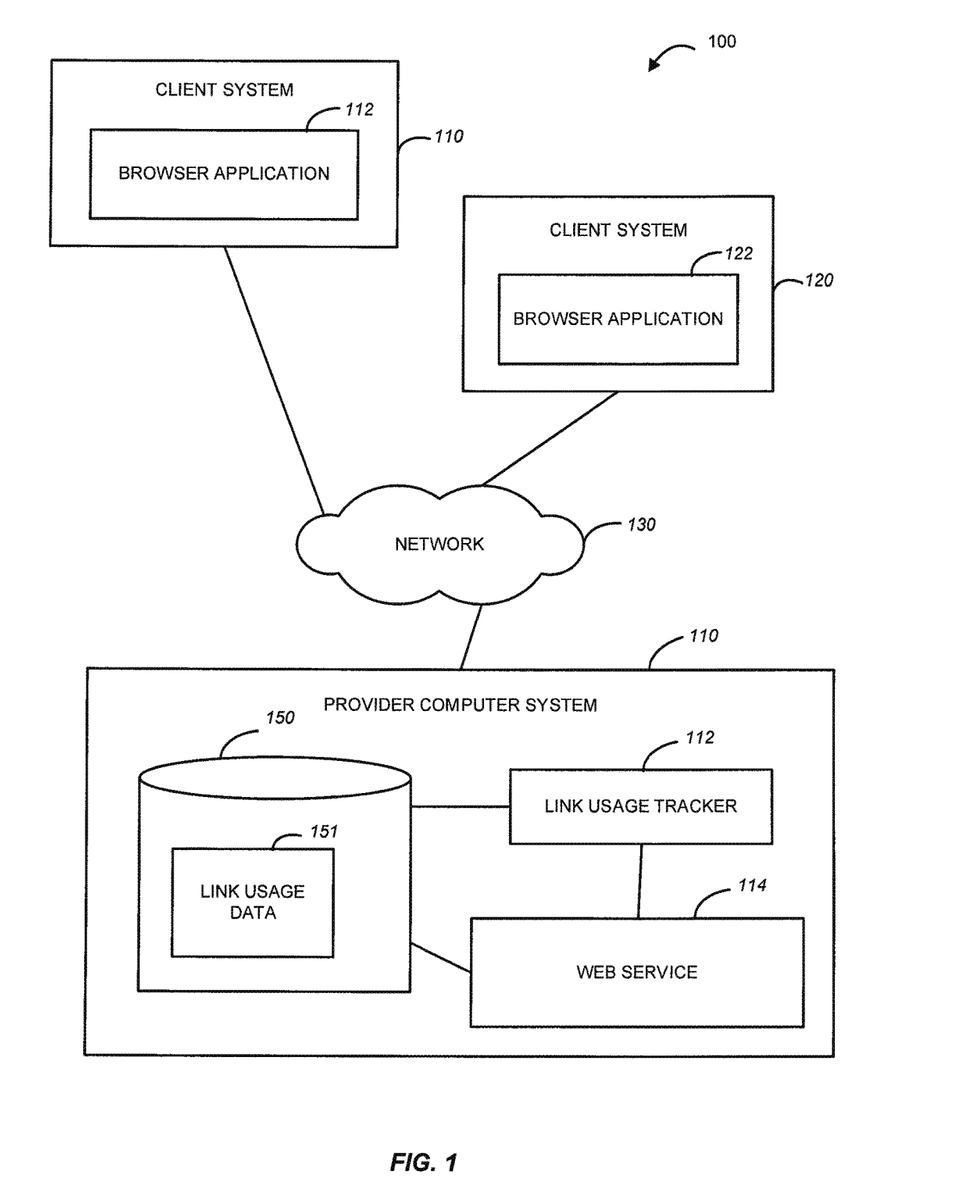
FIG. 1 is a diagrammatic representation of a network environment within which an example method and system for tracking web link usage may be implemented, showing a provider computer system hosting an example link usage tracker module.
Figure 2:
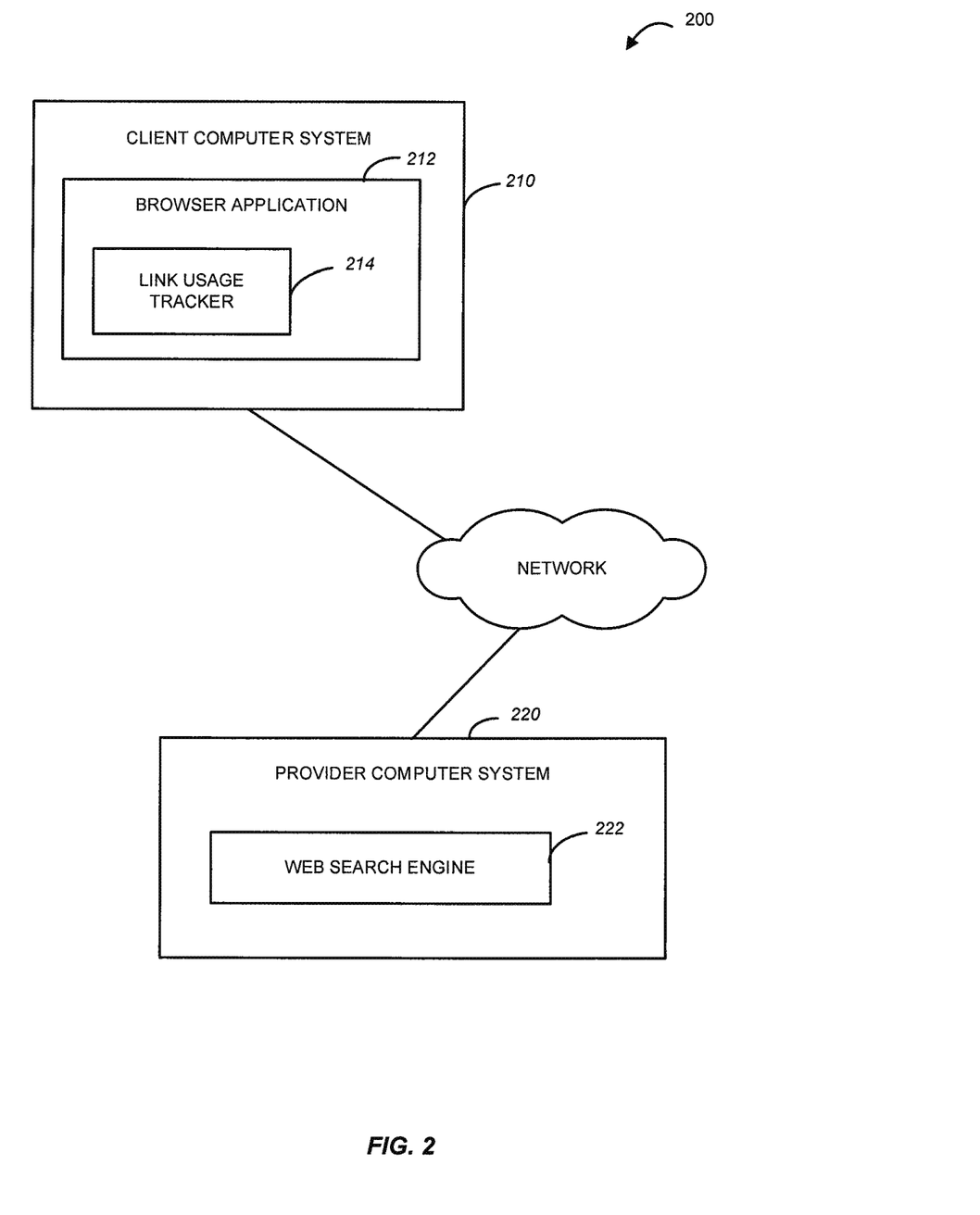
FIG. 2 is a diagrammatic representation of a network environment within which an example method and system for tracking web link usage may be implemented, showing a client computer system hosting an example link usage tracker module.

An example method and system for tracking web link usage may be implemented in the context of a network environment illustrated in FIGS. 1 and 2. FIG. 1 is a diagrammatic representation of a network environment 100 within which an example method and system for tracking web link usage may be implemented, showing a provider computer system 110 hosting a link usage tracker module 112 (also referred to as merely the link usage tracker 112). The link usage tracker 112 may be configured to monitor requests to activate links associated with web pages provided by a web service 114 and store information associated with these requests as associated with respective user sessions. A request to activate a link associated with a web page may also be referred to as a "click."

The provider computer system 110 is in communication with client computer systems 120 and 140. The client computer systems 120 and 140 may run respective browser applications 122 and 142 and may have access to the provider computer system 110 via a communications network 130. The communications network 130 may be a public network (e.g., the Internet, a wireless network, etc.) or a private network (e.g., a local area network (LAN), a wide area network (WAN), Intranet, etc.). Link usage data 152 collected by the link usage tracker 112 may be stored in a repository 150. An example partial code for storing link information is shown in Table 1 below.

TABLE 1

<meta name="ageUnit" content="minutes" />
<meta name="ageAnimation" content=" JavaScript" />
...
<a href="http://www.paypal.com/accounts" target="_blank"
lastUsageAge="5" history Display="desolve">PayPal Accounts</a>
<a href="http://www.paypal.com/help" target="_blank"
lastUsageAge="1" historyDisplay="desolve">PayPal Help</a>
<a href="http://www.paypal.com/register" target="_blank">Register to
use PayPal</a>

Referring to Table 1 above, meta tags at the top of the HTML page could indicate page level values. This could be used in the case of the browser client plug-in (e.g., the link usage tracker 214 shown in FIG. 2). In one embodiment, based on the "lastUsageAge" attribute, the plug-in would render the link in a different color or highlighting. The "historyDisplay" may be associated with a control on the type of animation or how to display the aged links.

FIG. 2 is a diagrammatic representation of a network environment 200 within which an example method and system for tracking web link usage may be implemented, showing a client computer system 210 hosting a link usage tracker module 214 (also referred to as merely the link usage tracker 214). The link usage tracker 214 may be configured to monitor requests to activate links associated with web pages obtained by a browser application 212 (e.g., from web services such as a web search engine 222 hosted by a provider computer system 220) and store information associated with these requests locally at the client computer system 210 as associated with respective the user session. The link usage tracker 214 may then utilize the stored link usage information to modify web pages that include those links such that the modified web page, when rendered, provides meaningful information regarding the usage of the web links.

Figure 3:
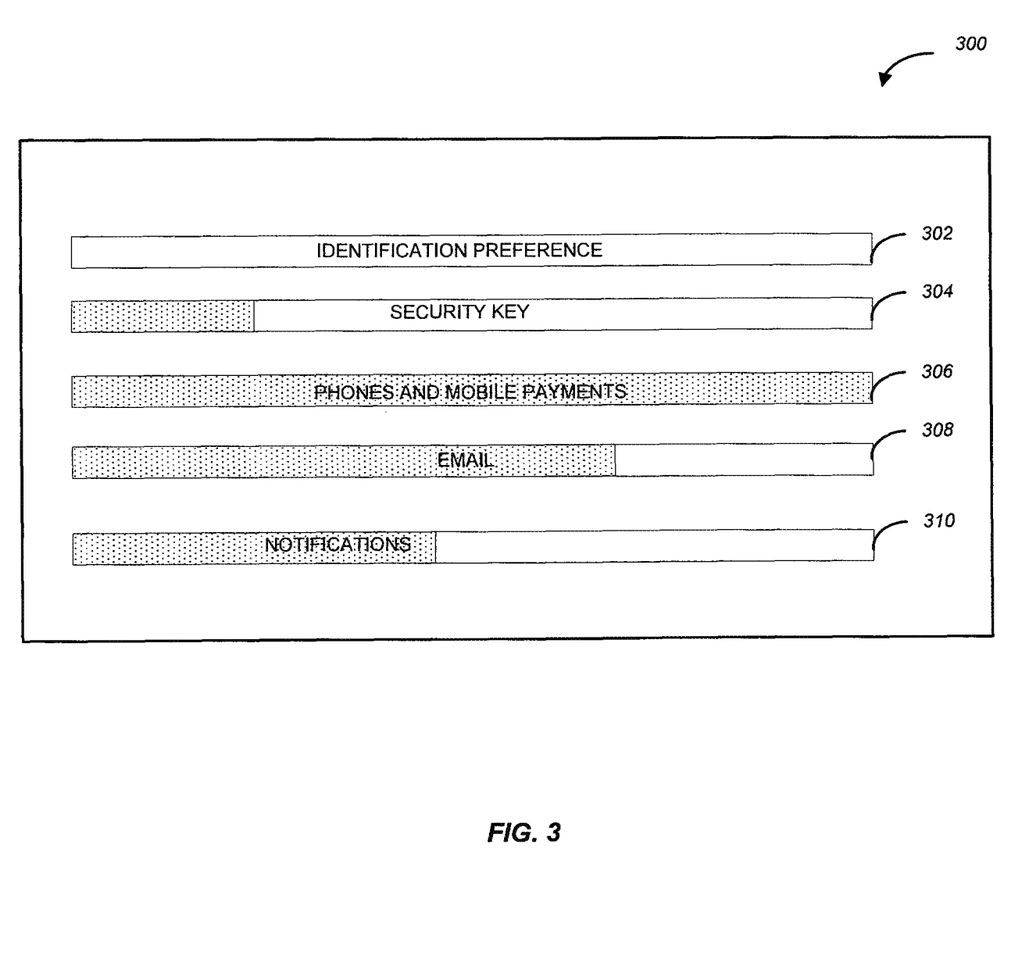
FIG. 3 is a diagram of a user interface comprising an example presentation of links on a web page indicating inferred relevance of respective links to a user associated with a current user session, in accordance with one example embodiment.

FIG. 3 is a diagram of a user interface 300 comprising an example presentation of links on a web page indicating inferred relevance of respective links to a user associated with a current user session. For example, the links that have been activated by the user more recently may be presented with more intensive highlighting than the links that have been activated by the user less recently. In another example, the intensity of highlighting of a link may be determined by a link usage tracker based on the frequency with which the links has been activated. Shown in FIG. 3 are links 302-310, each displayed utilizing different shading or highlighting.

As shown in FIG. 3, the "Phones and Mobile Payments" link 306 has the greatest highlighting, from which a user is to infer that she has activated this link most recently. The "Identification Preference" link 302 is not highlighted at all, from which the user is to infer that the link has not been activated at all or in a long time (e.g., since a predetermined threshold date). Another example of providing a user with information regarding the relevance of a link presented on a web page is shown in FIG. 4.

Figure 4:
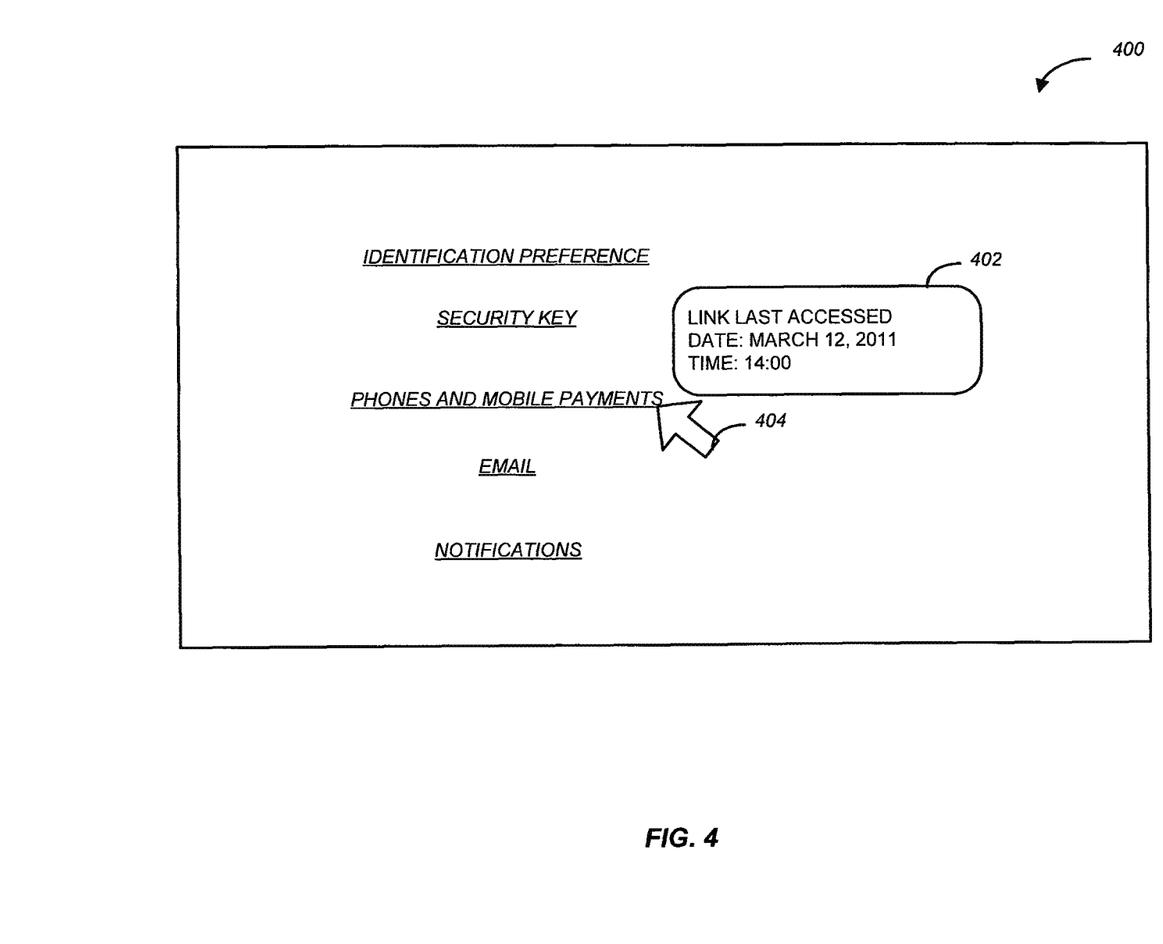
FIG. 4 is a diagram of a user interface comprising an example presentation of usage information associated with a link on a web page utilizing a hover balloon, in accordance with one example embodiment.

FIG. 4 is a diagram of a user interface 400 comprising an example presentation of usage information associated with a link on a web page utilizing a hover balloon 402. As shown in FIG. 4, a cursor 404 is positioned at the "Phones and Mobile Payments" link, which causes the presentation of the hover balloon 402 that displays link usage information. The definition of the hover balloon 402, in one embodiment, is included into the HTML content of the webpage presenting the user interface 400 by a link usage tracker. As explained above, a link usage tracker may reside at a client computer system hosting a browser application, in which case the link usage tracker modifies the web page obtained from a provider computer system before the web page is rendered by the browser. In some embodiments, a link usage tracker may reside at a provider computer system that that provides web pages, in which case the link usage tracker modifies the web page utilizing link usage data before the web page is transmitted to the requesting client computer system. An example link usage tracker may be described with reference to FIG. 5.

Figure 5:
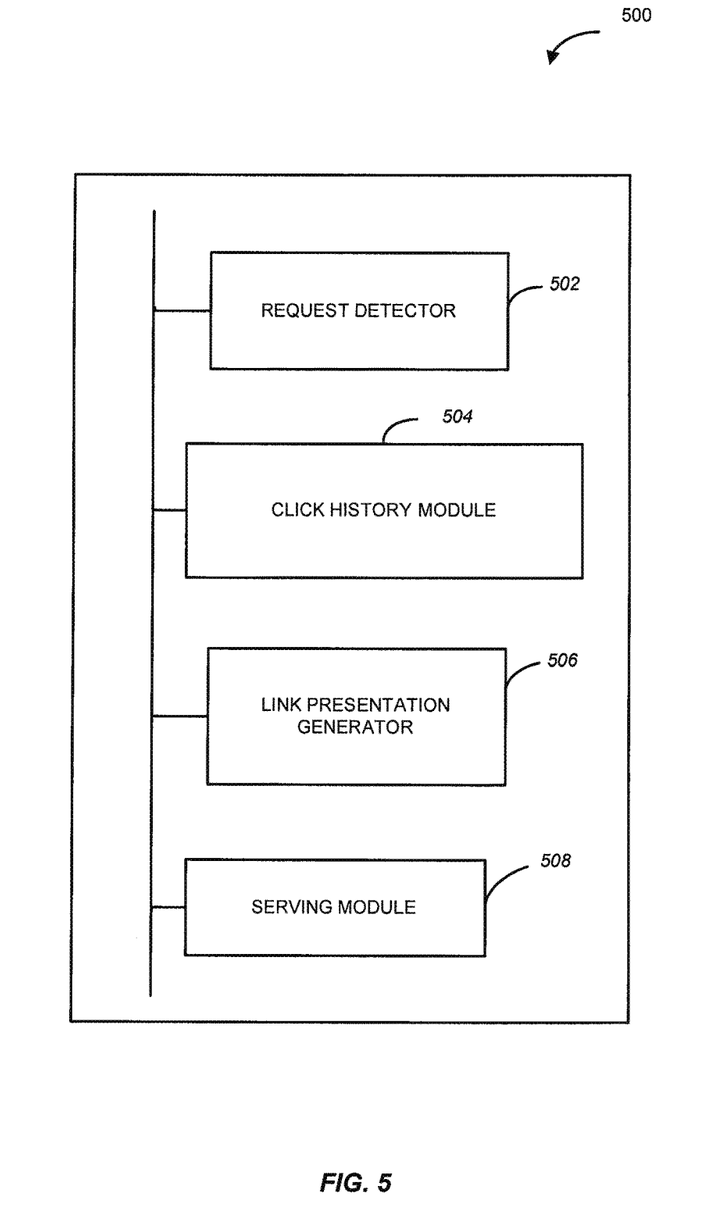
FIG. 5 is block diagram of a system for tracking web link usage, in accordance with one example embodiment.

FIG. 5 is a block diagram of a system 500 for tracking web link usage (a link usage tracker), in accordance with one example embodiment. As shown in FIG. 5, the system 500 includes a request detector 502, a click history module 504, a link presentation generator 506, and a serving module 508.

As explained above, a web link tracker may reside at a provider system or at a client system.

The request detector 502 may be configured to receive a request for a web page comprising a web link. The request is associated with a user session (e.g., which may be indicated by an identification of a client computer system or a browser application associated with the request). In one embodiment, the user session could be tracked by utilizing a cookie that is written to the browser to indicate a new user session. The cookie would store information indicative of when the user has last visited the site even if they don't log in. In another embodiment, the session tracking may be performed on the browser side. This method may entail writing a unique identification value that is hidden from the user but is passed from the browser to the server. This id may be in the form of a URL (e.g., www.company.com/?jsession=123344) or it may be a hidden field in a submission form.

The click history module 504 may be configured to access click history associated with the user account. The click history, which may be stored locally with respect to the link usage tracker, may store various information related to the usage of one or more links, such as, e.g., a time-since-click value for respective links, a frequency-of-use value for respective links, a rank value for respective links, etc. The time-since-click value, for example, may reflect a measure of time since the web link was last activated utilizing the user account. The frequency-of-use value may reflect frequency with which the web link was being activated utilizing the user account. The rank value for a web link from the plurality of web links may be calculated based on the frequency-of-use value and the time-since-click value, as compared to these values for other web links for which the click history is being maintained.

The link presentation generator 506 may be configured to modify the web page, utilizing the click history, to generate a modified web page. In embodiments where the link usage tracker resides at a client computer system (e.g., where the link usage tracker is provided as a feature of a browser application), the link presentation generator 506 modifies the web page before the web page is being rendered. In embodiments where the link usage tracker resides at a provider computer system, the link presentation generator 5062 modifies the web page before the web page is being communicated to the requesting client computer system.

The link presentation generator 506, in one embodiment, may be configured to modify a web page that includes a link, for which the click history is being maintained, by selecting a highlighted presentation from a plurality of highlighted presentations to be applied to the web link. The highlighted presentation is selected based on the click history associated with the web link. Referring to FIG. 3 described above, the highlighting (or shading) of the links 302-310 shown in FIG. 3 is selected by the link presentation generator 506 based on respective click history values for those links. The highlighting associated with the link 306 may indicate that less than a predetermined amount of time elapsed since the last time the link 306 was activated utilizing the user account.

In some embodiments, the link presentation generator 506 may be configured to modify a web page that includes a link, for which the click history is being maintained, by adding one or more information items from information items stored in the click history to be presented on the modified web page as associated with the web link. For example, referring to FIG. 4 described above, the link 402 is presented together with a hover balloon presenting the date and time when the link 404 was last accessed, whenever the user positions a cursor over the link 402.

Returning to FIG. 5, the serving module 508 may be configured to serve the modified web page in response to the request for the web page. In embodiments where the system 500 (the link usage tracker) resides at a client computer system, the serving module 508 may be configured to render the modified web page utilizing an interpreter provided with a web browser application executing at the client computer system. In embodiments where the system 500 (the link usage tracker) resides at a provider computer system, the serving module 508 may be configured to communicate the modified web page from the provider computer system to the requesting client computer system. An example method for tracking web link usage can be described with reference to FIG. 6.

Figure 6:
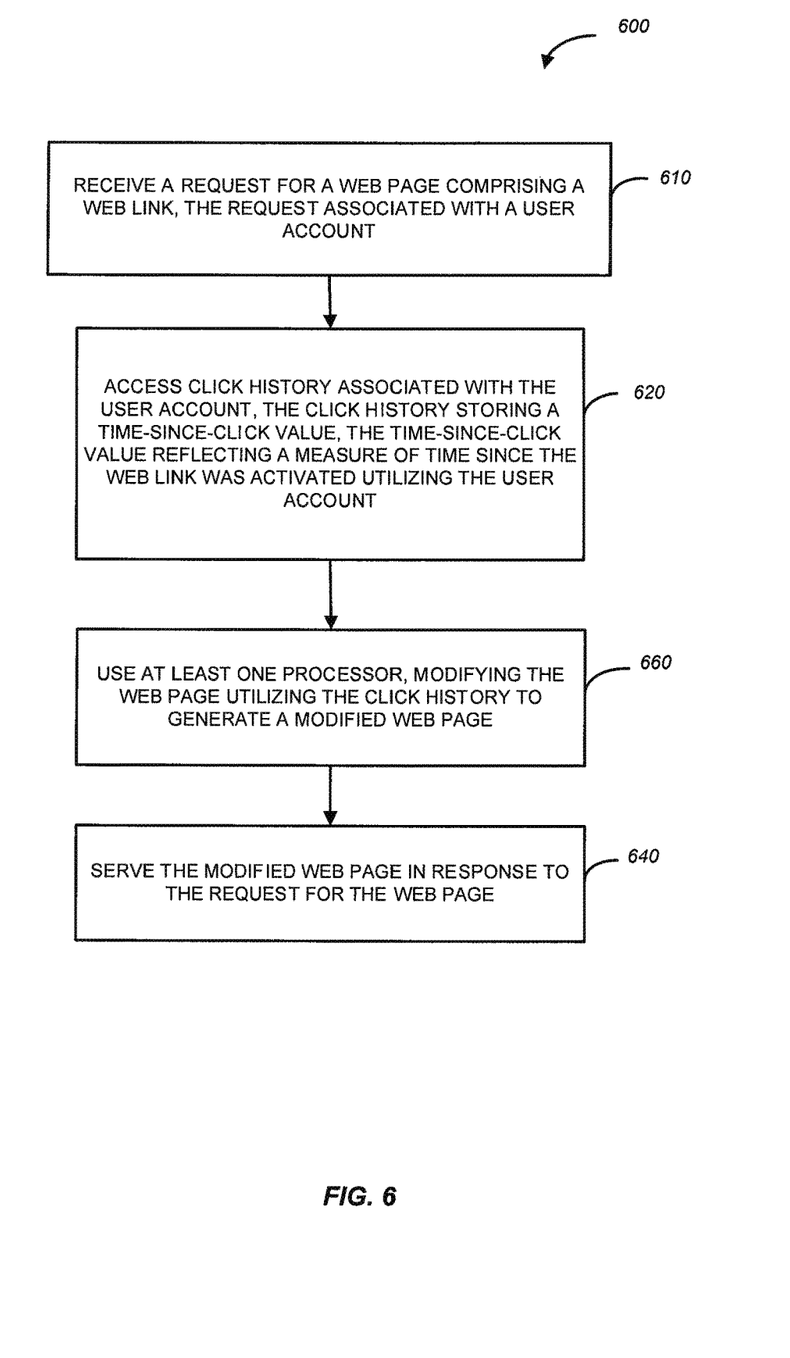
FIG. 6 is a flow chart of a method for tracking web link usage, in accordance with an example embodiment.

FIG. 6 is a flow chart of a method 600 for tracking web link usage, according to one example embodiment. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 160 of FIG. 1 and, specifically, at the system for tracking web link usage shown in FIG. 5.

As shown in FIG. 6, the method 600 commences at operation 610, when the request detector 502 of FIG. 5 receives a request for a web page comprising a web link (also referred to as merely link). The request may be associated with a user session (e.g., which may be indicated by an identification of a client computer system or a browser application associated with the request). At operation 620, the click history module 504 of FIG. 5 accesses click history associated with the user account, At operation 630, the link presentation generator 506 of FIG. 5 may be configured to modify the web page, utilizing the click history, to generate a modified web page. As described above with reference to FIG. 5, in embodiments where the link usage tracker resides at a client computer system (e.g., where the link usage tracker is provided as a feature of a browser application), the link presentation generator 506 modifies the web page before the web page is being rendered. In embodiments where the link usage tracker resides at a provider computer system, the link presentation generator 506 modifies the web page before the web page is being communicated to the requesting client computer system. The modifying of the web page performed at operation 630, may entail selecting a highlighted presentation from a plurality of highlighted presentations to he applied to the web link or adding one or more information items from information items stored in the click history to be presented on the modified web page as associated with the web link.

At operation 640, the serving module 502 serves the modified web page. As described above, in embodiments where the system 500 (the link usage tracker) resides at a client computer system, the serving module 502 renders the modified web page utilizing an interpreter provided with a web browser application executing at the client computer system. In embodiments where the system 500 resides at a provider computer system, the serving module 502 communicates the modified web page from the provider computer system to the requesting client computer system.

Figure 7:
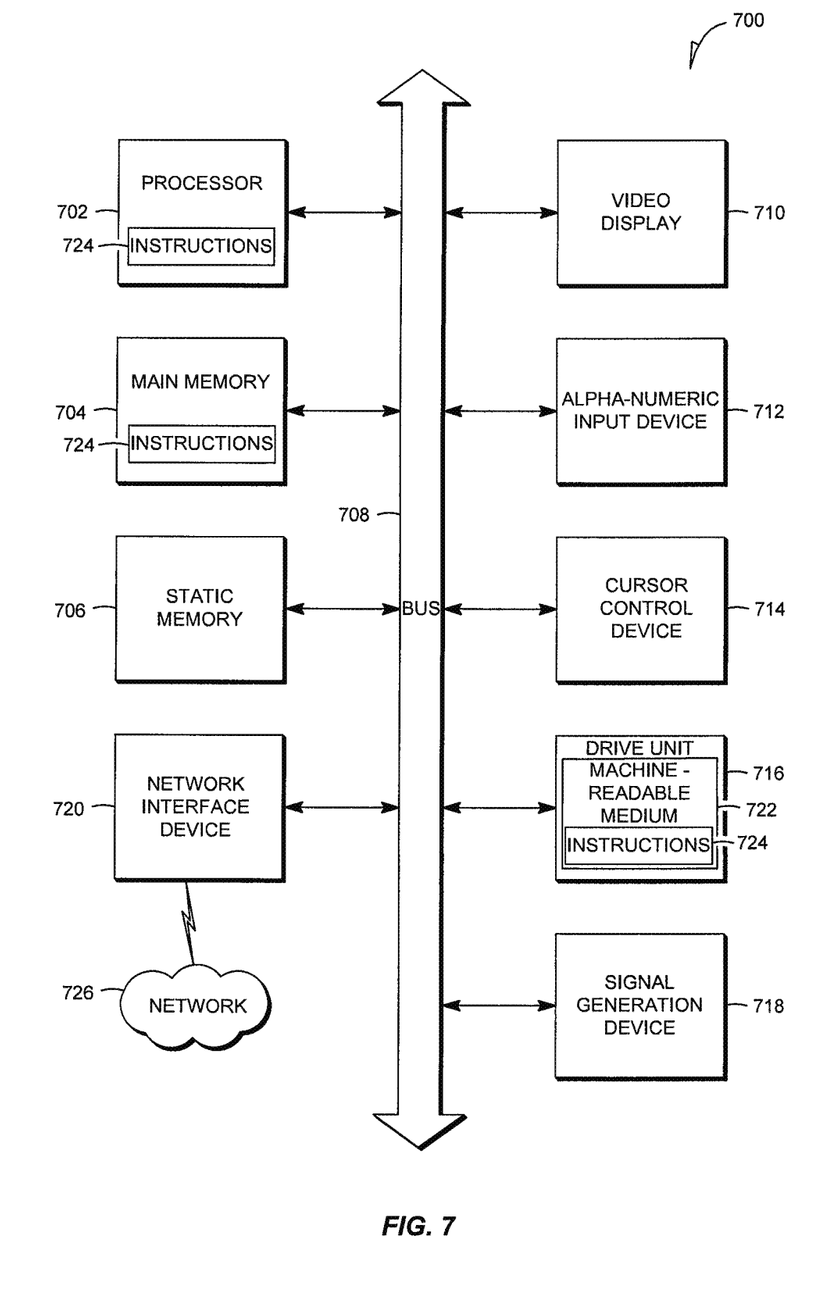
FIG. 7 is a diagrammatic representation of an example machine in the form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine, Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720, The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for tracking usage of web links has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
receiving, from a client device associated with a user account, a request for a web page comprising at least a first web link and a second web link;
accessing a click history associated with the user account, the click history storing time-since-click values for the first web link and the second web link, the time-since-click values reflecting measures of time since the respective first and second web links were activated utilizing the user account;
modifying the web page based on the click history to generate a modified web page, the modified web page including a modified presentation of the web links, the modified presentation indicating, via a first highlighting of the first web link, that less than a predetermined amount of time elapsed since the last time the first web link was activated, and the modified presentation indicating, via a second highlighting of the second web link, that more than the predetermined amount of time elapsed since the last time the second web link was activated, the first highlighting of the first web link different than the second highlighting of the second web link; and
serving the modified web page in response to the request for the web page.

2. The method of claim 1, wherein the modifying the web page comprises modifying HyperText Markup Language (HTML) content of the web page.

3. The method of claim 1, wherein the modifying of the web page is performed at a computer system hosting a web site that provides the web page.

4. The method of claim 1, wherein the modifying of the web page is performed at a client system of a user associated with the user account.

5. The method of claim 1, wherein the click history is generated using a browser plug-in.

6. The method of claim 1, wherein the click history is generated using a tracking feature provided as a native feature of a browser.

7. The method of claim 1, further comprising tracking links clicked by a user associated with the user account based upon a login session, and storing information about the clicked links as the click history.

8. The method of claim 1, wherein the modified web page includes a hover balloon functionality to display at least one of a date or a time when the first web link was last accessed by a user associated with the user account.

9. The method of claim 1, wherein the click history is stored in a database or locally with respect to a browser application used by a user associated with the user account.

10. The method of claim 1, wherein a user associated with the user account is permitted to customize a way in which the highlighting or previous click history information is displayed.

11. A computer-implemented system comprising:
a request detector, implemented using the least one processor, to receive a request for a web page comprising at least a first web link and a second web link, the request associated with a user account;
a click history module, implemented using the least one processor, to access a click history associated with the user account, the click history storing time-since-click values for the first web link and the second web link, the time-since-click values reflecting measures of time since the respective first and second web links were activated utilizing the user account;
a link presentation generator, implemented using the least one processor, to modify the web page based on the click history to generate a modified web page, the modified web page including a modified presentation of the web links, the modified presentation indicating, via a first highlighting of the first web link, that less than a predetermined amount of time elapsed since the last time the first web link was activated, and the modified presentation indicating, via a second highlighting of the second web link, that more than the predetermined amount of time elapsed since the last time the second web link was activated, the first highlighting of the first web link different than the second highlighting of the second web link; and
a serving module, implemented using the least one processor, to serve the modified web page in response to the request for the web page.

12. The system of claim 11, wherein the modifying the web page comprises modifying HyperText Markup Language (HTML) content of the web page.

13. The system of claim 11, wherein the modifying of the web page is performed at a computer system hosting a web site that provides the web page.

14. The system of claim 11, wherein the modifying of the web page is performed at a client system of a user associated with the user account.

15. The system of claim 11, wherein the click history is generated using a browser plug-in.

16. The system of claim 11, wherein the click history is generated using a tracking feature provided as a native feature of a browser.

17. The system of claim 11, further comprising tracking links clicked by a user associated with the user account based upon a login session, and storing information about the clicked links as the click history.

18. The system of claim 11, wherein the modified web page includes a hover balloon functionality to display at least one of a date or a time when the first web link was last accessed by a user associated with the user account.

19. The system of claim 11, wherein the click history is stored in a database or locally with respect to a browser application used by a user associated with the user account.

20. A machine-readable non-transitory medium having instruction data to cause a machine to perform operations comprising:
receiving, from a client device associated with a user account, a request for a web page comprising at least a first web link and a second web link;
accessing a click history associated with the user account, the click history storing time-since-click values for the first web link and the second web link, the time-since-click values reflecting measures of time since the respective first and second web links were activated utilizing the user account; and
modifying the web page based on the click history to generate a modified web page, the modified web page including a modified presentation of the web links, the modified presentation indicating, via a first highlighting of the first web link, that less than a predetermined amount of time elapsed since the last time the first web link was activated, and the modified presentation indicating, via a second highlighting of the second web link, that more than the predetermined amount of time elapsed since the last time the second web link was activated, the first highlighting of the first web link different than the second highlighting of the second web link.

* * * * *